United States Patent
Datye et al.

(10) Patent No.: US 10,911,227 B2
(45) Date of Patent: Feb. 2, 2021

(54) METHOD AND SYSTEM FOR MANAGING CENTRALIZED ENCRYPTION AND DATA FORMAT VALIDATION FOR SECURE REAL TIME MULTI-PARTY DATA DISTRIBUTION

(71) Applicant: Mastercard International Incorporated, Purchase, NY (US)

(72) Inventors: Moreshwar Mukund Datye, Maharashtra (IN); Ashutosh Subhash Gijare, Maharashtra (IN); Krishna Prasad Vasireddy, Milpitas, CA (US); Christopher T. Wischerth, Babylon, NJ (US); Eric Alger, Edwardsville, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 295 days.

(21) Appl. No.: 15/951,415

(22) Filed: Apr. 12, 2018

(65) Prior Publication Data

US 2019/0319784 A1    Oct. 17, 2019

(51) Int. Cl.
*H04L 29/06* (2006.01)
*H04L 9/08* (2006.01)
(Continued)

(52) U.S. Cl.
CPC .............. *H04L 9/083* (2013.01); *H04L 9/14* (2013.01); *H04L 9/30* (2013.01); *H04L 63/0435* (2013.01)

(58) Field of Classification Search
CPC ... H04L 9/083; H04L 9/14; H04L 9/30; H04L 63/0435
See application file for complete search history.

(56) References Cited

U.S. PATENT DOCUMENTS 9,608,809 B1 *  3/2017  Ghetti ................... G06F 21/316
9,667,417 B1 *  5/2017  Statica ................ G06F 3/04886
(Continued)

FOREIGN PATENT DOCUMENTS

EP      2 429 116 A2    3/2012

OTHER PUBLICATIONS

Extended European Search Report dated Jul. 17, 2019, by the European Patent Office in corresponding European Patent Application No. 19156525.8-1218. (11 pages).

*Primary Examiner* — Sher A Khan
(74) *Attorney, Agent, or Firm* — Buchanan Ingersoll & Rooney PC

(57) ABSTRACT

A method for facilitating the broadcast of encrypted data includes: storing a content encryption key and a server private key of a first cryptographic key pair; storing a recipient profile, the profile being related to a recipient computing device including a recipient public key of a second cryptographic key pair; receiving a broadcast request from a broadcast computing device including an broadcast message encrypted using the content encryption key; identifying a unique identifier; transmitting a data message including the encrypted broadcast message and the unique identifier; receiving a key request from the recipient computing device including the unique identifier; verifying that the unique identifier included in the key request is equivalent to the identified unique identifier; encrypting the content encryption key using the recipient public key; and transmitting the encrypted content encryption key to the recipient computing device.

14 Claims, 6 Drawing Sheets

(51) Int. Cl.
*H04L 9/14* (2006.01)
*H04L 9/30* (2006.01)

(56) References Cited

U.S. PATENT DOCUMENTS

| | | | | |
|---|---|---|---|---|
| 2002/0111942 A1* | 8/2002 | Campbell | | G06F 16/958 |
| 2002/0184513 A1* | 12/2002 | Hori | | G06Q 20/346 |
| | | | | 713/193 |
| 2003/0016829 A1* | 1/2003 | Chu | | G06F 21/10 |
| | | | | 380/281 |
| 2004/0010467 A1* | 1/2004 | Hori | | H04L 9/0825 |
| | | | | 705/50 |
| 2004/0151308 A1 | 8/2004 | Kacker et al. | | |
| 2005/0100161 A1* | 5/2005 | Husemann | | G06Q 20/0855 |
| | | | | 380/200 |
| 2005/0235361 A1* | 10/2005 | Alkove | | G06F 21/10 |
| | | | | 726/27 |
| 2007/0038873 A1* | 2/2007 | Oliveira | | G06F 21/10 |
| | | | | 713/193 |
| 2007/0091345 A1* | 4/2007 | Qiu | | H04L 9/083 |
| | | | | 358/1.14 |
| 2008/0031458 A1* | 2/2008 | Raja | | H04L 9/30 |
| | | | | 380/279 |
| 2008/0092239 A1* | 4/2008 | Sitrick | | H04N 21/2347 |
| | | | | 726/27 |
| 2013/0311769 A1* | 11/2013 | Hayes | | H04L 9/30 |
| | | | | 713/155 |
| 2013/0343542 A1* | 12/2013 | Rosati | | H04L 9/30 |
| | | | | 380/270 |
| 2015/0006895 A1* | 1/2015 | Irvine | | H04L 9/3242 |
| | | | | 713/171 |
| 2015/0229471 A1* | 8/2015 | Nair | | H04L 9/0822 |
| | | | | 713/171 |
| 2017/0250972 A1* | 8/2017 | Ronda | | H04L 9/08 |
| 2017/0302656 A1* | 10/2017 | Ramatchandirane | | |
| | | | | H04L 63/166 |
| 2018/0012032 A1* | 1/2018 | Radich | | H04L 9/30 |
| 2018/0183604 A1* | 6/2018 | Sharma | | H04L 9/30 |
| 2018/0268159 A1* | 9/2018 | Yu | | H04L 9/0819 |

\* cited by examiner

METHOD AND SYSTEM FOR MANAGING CENTRALIZED ENCRYPTION AND DATA FORMAT VALIDATION FOR SECURE REAL TIME MULTI-PARTY DATA DISTRIBUTION

FIELD

The present disclosure relates to the broadcasting of encrypted data, specifically the use of a three party system for data distribution that utilizes a centralized encryption key along with separate keys for each recipient entity to provide for a broadcast of encrypted data to large number of parties while minimizing overall data distribution.

BACKGROUND

Currently, encryption for distributed, multi-party broadcasters and recipient systems operates in one of two ways. First, a point-to-point connection between the broadcasters and recipient systems can be used, which requires significant communication and processing by the broadcasters as it must separately communicate with every recipient system, establishing separate keys with each and distributing a different copy of the broadcast message, encrypted for the specific recipient, to each recipient, which greatly increases the processing power and network bandwidth needed by the broadcaster. Second, the broadcaster can establish a separate key for each recipient that is wrapped in a header of the broadcast message that is distributed to the group of recipients. However, as the number of recipients increases, the size of the header, and thus size of the transmission, grows significantly, requiring ever-increasing communication bandwidth. This also results in an increase in processing needed at the recipient system, which has to process the header to identify the key intended for themselves for decryption thereof to decrypt the broadcast message.

Thus, there is a need for a technological solution to provide for distribution of a broadcast message to be received in real-time by a plurality of different recipient systems that may be independently decrypted by each recipient but not any unintended recipient that minimizes the number of communications necessary while also reducing the data size of transmissions to reduce overall bandwidth.

SUMMARY

The present disclosure provides a description of systems and methods for the broadcasting of encrypted data. An encryption system, also referred to herein as an encryption system, operates between the broadcaster and recipients, which is used to manage content encryption keys used to encrypt the broadcast message. The encryption system distributes content encryption keys that are encrypted by recipient keys to the corresponding recipients upon validation of that recipient using a unique identifier that corresponds to a broadcast message that is made available to recipients. The recipient receives the unique identifier from the broadcaster, which enables the broadcaster to control the on-boarding process for recipients and access to broadcast messages, without having to separately broadcast the message to every recipient. The encryption system is used as a centralized point for distribution of the broadcast message, where the content encryption key is distributed to validated recipients on request using the unique identifier, negating the need for wrapping broadcast messages with multiple keys or for point to point communication channels to be maintained. As a result, the methods and systems discussed herein provide for the real-time broadcast of data messages to a plurality of recipients that utilizes a minimal amount of communications of minimal data sizes over traditional systems.

A method for facilitating the broadcast of encrypted data includes: storing, in a memory of a processing server, at least a content encryption key and a server private key of a first cryptographic key pair; storing, in a recipient database of the processing server, a recipient profile, wherein the recipient profile is a structured data set related to a recipient computing device including at least a recipient public key of a second cryptographic key pair; receiving, by a receiving device of the processing server, a broadcast request from a broadcast computing device, wherein the broadcast request includes at least an encrypted broadcast message, where the encrypted broadcast message is encrypted using the content encryption key; identifying, by a data identification module of the processing server, a unique identifier; electronically transmit, by a transmitting device of the processing server, a data message including at least the encrypted broadcast message and the unique identifier; receiving, by the receiving device of the processing server, a key request from the recipient computing device, wherein the key request includes at least the unique identifier; verifying, by a verification module of the processing server, that the unique identifier included in the key request is equivalent to the unique identifier identified by the processing server; encrypting, by an encryption module of the processing server, the content encryption key using the recipient public key; and electronically transmitting, by the transmitting device of the processing server, the encrypted content encryption key to the recipient computing device.

A system for facilitating the broadcast of encrypted data includes: a verification module of a processing server; an encryption module of the processing server; a memory of the processing server configured to store at least a content encryption key and a server private key of a first cryptographic key pair; a recipient database of the processing server configured to store a recipient profile, wherein the recipient profile is a structured data set related to a recipient computing device including at least a recipient public key of a second cryptographic key pair; a receiving device of the processing server configured to receive a broadcast request from a broadcast computing device, wherein the broadcast request includes at least an encrypted broadcast message, where the encrypted broadcast message is encrypted using the content encryption key; a data identification module of the processing server configured to identify a unique identifier; and a transmitting device of the processing server configured to electronically transmit a data message including at least the encrypted broadcast message and the unique identifier, wherein the receiving device of the processing server is further configured to receive a key request from the recipient computing device, wherein the key request includes at least the unique identifier, the verification module of the processing server is configured to verify that the unique identifier included in the key request is equivalent to the unique identifier identified by the processing server; the encryption module of the processing server is configured to encrypt the content encryption key using the recipient public key, and the transmitting device of the processing server is further configured to electronically transmit the encrypted content encryption key to the recipient computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for the Broadcasting of Encrypted Data Messages

Figure 1:
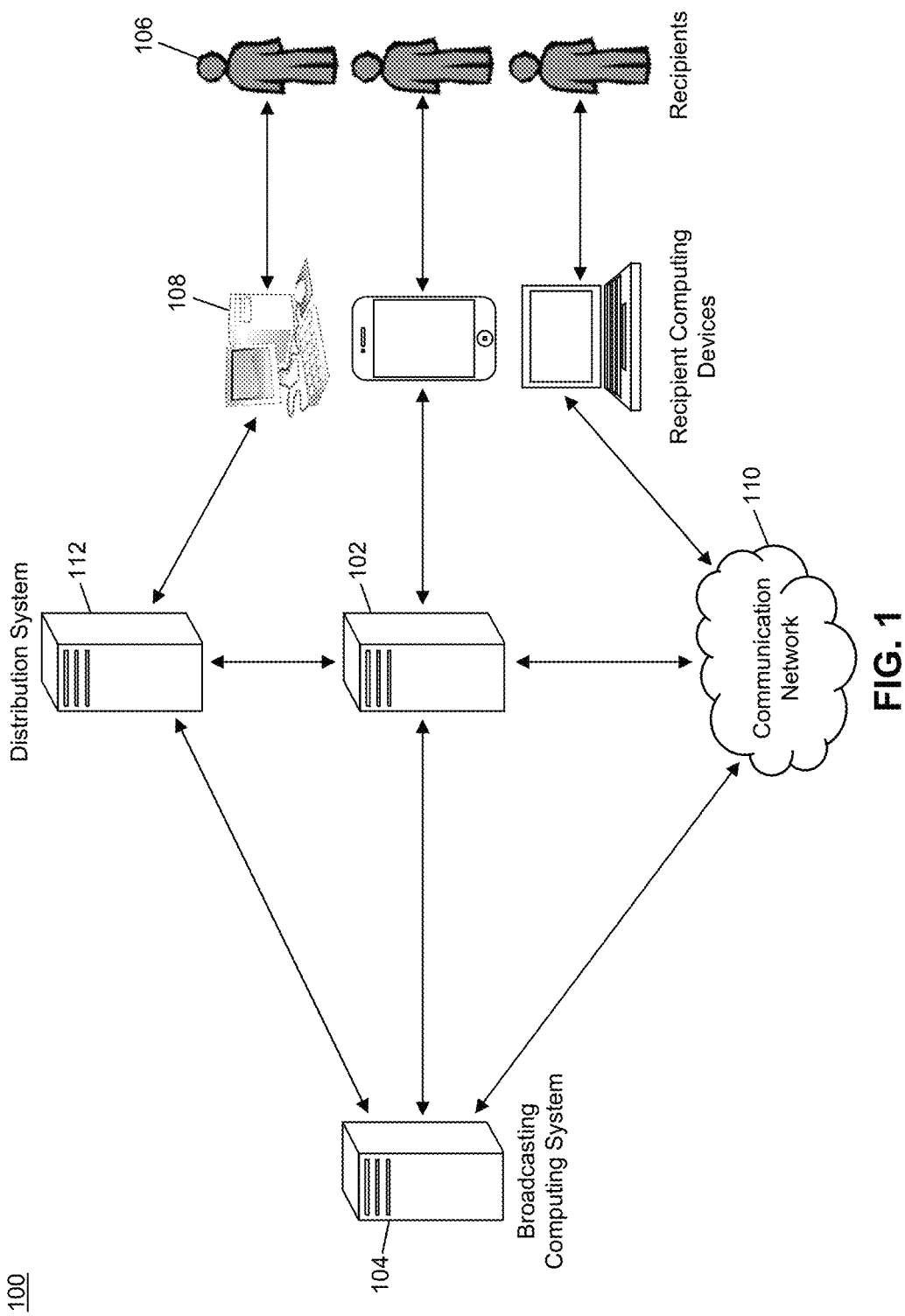
FIG. 1 is a block diagram illustrating a high level system architecture for multi-party distribution of broadcast data using a third party in accordance with exemplary embodiments.

FIG. 1 illustrates a system 100 for the broadcasting of encrypted data messages to multiple parties for the decryption thereof using keys distributed through a third party encryption system.

The system 100 may include a processing server 102. The processing server 102, discussed in more detail below, may be configured to operate as a third party distributor of encrypted keys used for the decryption of encrypted broadcast messages that are broadcast by a broadcasting computing system 104 to a plurality of different recipients 106. The broadcasting computing system 104 may generate a data message that is to be broadcast to a plurality of recipients 106. The data message, also referred to herein as a broadcast message, may be encrypted such that it may be widely broadcast but where the included data (e.g., after decryption) is obtainable by authorized recipients 106.

The broadcast message may be encrypted using a content encryption key. The content encryption key may be a single key used for encryption and decryption, or may be an encryption key of a cryptographic key pair, where the corresponding decryption key may be used to decrypt data encrypted using the encryption key. In such cases, both the encryption and decryption key may be referred to herein as the content encryption key, where the content encryption key may generally refer to keys used to encrypt or decrypt the broadcast message. In one embodiment, the broadcasting computing system 104 may generate the content encryption key, and may provide the content encryption key to the processing server 102 using a suitable communication network and method. In other embodiments, the processing server 102 may generate the content encryption key, which may be provided to the broadcasting computing system 104 thereby. In some cases, transmissions between the broadcasting computing system 104 and processing server 102, such as of the content encryption key, may be encrypted or otherwise protected from intercept of transmitted data using suitable methods. In some instances, the processing server 102 and broadcast computing system 104 may independently generate identical content encryption keys using methods previously agreed upon by each system.

The broadcast message may be encrypted using the content encryption key and then broadcast for receipt by the recipients 106. In some embodiments, the broadcasting computing system 104 may broadcast the encrypted broadcast message to a plurality of different recipient computing devices 108 using any suitable type of communication network 110, such as the internet, a cellular communication network, local area network, wide area network, etc. For instance, in one example, the broadcast message may be transmitted through a plurality of different communication networks 110 to an application program executed by each recipient computing device 108 configured for receipt thereof. In another example, the broadcasting computing system 104 may place the encrypted broadcast message on a web site, which may be retrieved by each recipient computing device 108 using a suitable method. In one embodiment, the broadcasting computing system 104 may transmit the encrypted broadcast message to the processing server 102, which may broadcast or otherwise make the broadcast message available to the recipient computing devices 108. In another embodiment, a separate distribution system 112 may be used to distribute the encrypted broadcast message to the recipient computing devices 108. In some cases, the encrypted broadcast message may be freely available and/or accessible such that any computing device may receive the encrypted broadcast message, but where decryption of the encrypted broadcast message may only be accomplished by authorized recipient computing devices 108 using the methods discussed herein.

Each content encryption key may be associated with a unique identifier. The unique identifier may be a unique value that is associated with a specific content encryption key, and may be of any type or format suitable for use in performing the functions discussed herein, such as a number, alphanumeric value, hexadecimal value, etc. The unique identifier may be generated by the processing server 102 or the broadcasting computing system 104 and exchanged between both systems. In some instances, a broadcast message may be encrypted by several different content encryption keys, for which each may have a corresponding unique identifier. For example, each time the broadcasting computing system 104 broadcasts the message, a different content encryption key may be used for the encryption thereof. In some cases, a separate content encryption key may be used for every authorized recipient 106, where a different unique identifier may be generated for each recipient 106 corresponding to the respective content encryption key.

The processing server 102 may store the unique identifier with each associated content encryption key that was used to encrypt the broadcast message. The broadcasting computing system 104 may also possess each unique identifier. When a recipient 106 is authorized for decrypting of the broadcast message, the broadcast computing system 104 may distribute a unique identifier to a recipient computing device 108 associated therewith using the communication network 110. In some embodiments, the broadcasting computing system 104 may generate a cryptographic key pair used for the distribution of data to recipient computing devices 108, which may be comprised of a broadcast private key and a broadcast public key. The broadcast public key may be distributed to each recipient computing device 108 upon registration of a recipient 106 for receipt of broadcasted messages. The broadcast computing system 104 may encrypt the unique identifier using the broadcast private key prior to transmission to the recipient computing device 108, where the recipient computing device 108 may decrypt the unique identifier using the previously received broadcast public key.

A recipient computing device 108 may thus possess a decrypted unique identifier and the encrypted broadcast message. When a recipient 106 wants to decrypt the encrypted broadcast message, the recipient 106 may, using their recipient computing device 106, submit a key request to the processing server 102 using a suitable communication network and method. The key request may include at least the unique identifier. In some embodiments, the processing server 102 may generate a cryptographic key pair comprised of a server private key and server public key. In these embodiments, the server public key may be distributed to recipient computing devices 108 by the processing server 102 or broadcasting computing system 104 during the registration of recipients 106, where a recipient computing device 108 may encrypt the key request prior to submission using the server public key. The processing server 102 may then decrypt the key request using the server private key. In such embodiments, successful decryption of the key request may constitute validation of the key request. In other embodiments, the key request may include additional data used to validate that the key request is received from an authorized recipient 106, such as authentication information (e.g., username, password, personal identification number, biometric data, etc.). In some instances, receipt of a valid unique identifier may constitute suitable validation of the recipient 106.

Once the processing server 102 has received a key request that is validated, if applicable, the processing server 102 may identify a content encryption key that corresponds to the unique identifier included therein. The content encryption key may then be itself encrypted prior to transmission to a recipient computing device 108. Each recipient computing device 108 may generate its own cryptographic key pair, comprised of a recipient private key and a recipient public key. During the registration of a recipient 106, the recipient public key of the associated recipient computing device 108 may be distributed to the processing server 102 and the broadcasting computing system 104. The processing server 102 may encrypt the identified content encryption key using the recipient computing device's recipient public key. In some embodiments, communications between a recipient computing device 108 and the processing server 102 and/or broadcasting computing system 104 may include a unique identification value, also referred to herein as a device identifier, associated with a recipient computing device 108 for identification thereof and use in identifying data associated therewith, such as the recipient public key, where the identification value may be any suitable type of value (e.g., media access control address, internet protocol address, telephone number, username, e-mail address, registration number, identification number, etc.). In such embodiments, the device identifier may be provided to the processing server 102 and broadcasting computing system 104 during registration, where the device identifier may be used by the processing server 102 in validation of the key request, such as to ensure that the recipient computing device 108 is authorized for receipt of the encrypted content encryption key.

The processing server 102 may respond to the key request submitted by the recipient computing device 108 with the encrypted content encryption key. The recipient computing device 108 may receive the encrypted content encryption key and decrypt it using its recipient private key. The recipient computing device 108 can then decrypt the encrypted broadcast message with the now-decrypted content encryption key. The result is that a broadcasting computing system 104 may freely broadcast a message that can only be decrypted by authorized recipients 106, but where the broadcast message does not need to include a header that is wrapped with a plurality of different keys, reducing in data size of broadcast messages and thus greatly reducing communication bandwidth. In addition, the broadcasting computing system 104 does not need to generate and store separate keys for every authorized recipient 106. Instead, only a single unique identifier and content encryption key needs to be generated for any given distribution of the broadcast message.

In some embodiments, a content encryption key may only be active for a predetermined period of time. After the predetermined period of time, the content encryption key may be destroyed by the processing server 102 and broadcasting computing system 104, requiring the generation of a new content encryption key and corresponding unique identifier. In such embodiments, destruction of the content encryption key may protect a broadcast message from future decryption to provide for increased security in the system 100 and protection against the leak of keys.

The system 100 may be used for the distribution of content in any number of contexts. For instance, in one example, the authorized recipients 106 may be merchants operating point of sale systems as part of a payment processing network. In such an example, the processing server 102 may be part of the payment processing network or operate on behalf thereof to distribute the encrypted keys, where the broadcast data message (e.g., broadcast by the payment processing network as the broadcasting computing system 104 or an authorized distribution system 112) may include new configuration data, routing information, formatting rules, etc. that may be used by recipient point of sale systems in updating data for use in future payment transactions. In another example, authorized recipients 106 may be financial institutions, such as banks, that receive new fraud rules and algorithms from a payment processing network for use in preventing fraud in payment transactions.

The use of the processing server 102 as a third party intermediary between the broadcasting system 104 and recipient computing devices 108 may ensure that broadcasting computing systems 104 are not required to participate in point-to-point communications with recipient computing devices 108 apart from the distribution of the unique identifier. In cases where the processing server 102 uses additional information for validation of key requests, the broadcasting computing system 104 may be able to freely distribute the unique identifier any time it is requested, requiring even less processing power to be utilized by the broadcasting computing system 104 and further reducing communication bandwidth used. In addition, the processing server 102 may accomplish the distribution of the content encryption key using no more than a single recipient public key for each authorized recipient computing device 108 and as little as one content encryption key, thus reducing overall processing and communication bandwidth utilized in the distribution of the broadcast messages. In cases where a distribution system 112 is used for the actual broadcast of the broadcast message, the distribution system 112 may not be required or need to possess a single key, further increasing operating efficiency in the system 100. As a result, the system 100 drastically reduces the processing power needed by any given entity, reduces the size of files that are distributed throughout the system, and also reduces the overall number of communications to ensure proper distribution and receipt by authorized recipients 106, thus resulting in a more efficiency and effective system for the distribution of broadcast messages to multiple parties.

Processing Server

Figure 2:
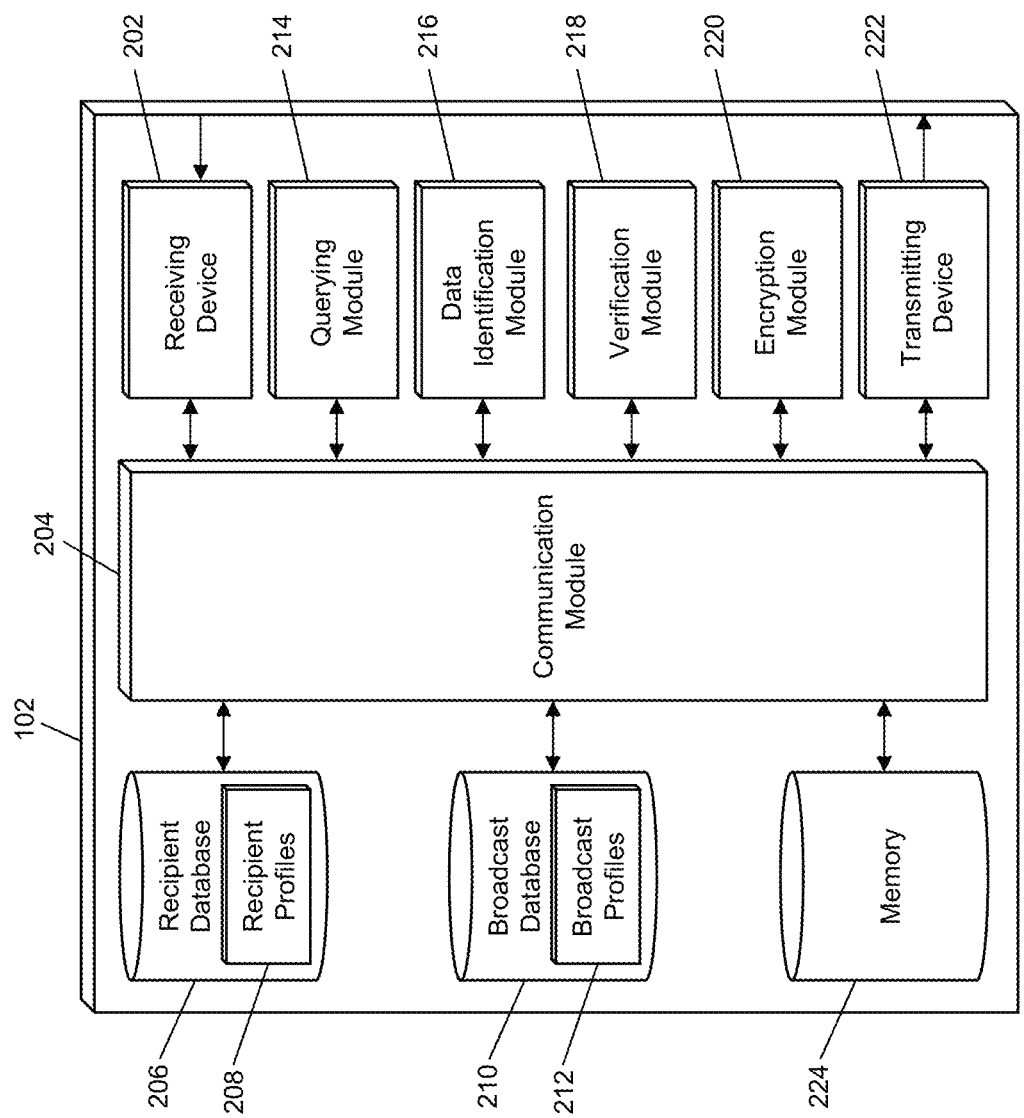
FIG. 2 is a block diagram illustrating the processing server of the system of FIG. 1 for the distribution of encrypted keys for decrypting broadcast data in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from broadcasting computing systems 104, recipient computing devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by broadcasting computing systems 104 that are superimposed or otherwise encoded with encrypted broadcast messages, content encryption keys, unique identifiers, or other data as discussed herein. The receiving device 202 may also be configured to receive data signals electronically transmitted by recipient computing devices 108, which may be superimposed or otherwise encoded with key requests, which may include at least a unique identifier and may include additional data, such as a recipient device identifier, authentication data, etc. In some instances, the receiving device 202 may receive registration messages from broadcasting computing systems 104 and/or recipient computing devices 108, which may include broadcast public keys, recipient public keys, recipient device identifiers, or other data for use in performing the functions of the processing server 102 as discussed herein. In some cases, communications received from the broadcasting computing system 104 and/or recipient computing devices 108 may be encrypted with a server public key for which the processing server 102 possess the corresponding server private key.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, data identification module 216, verification module 218, encryption module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a recipient database 206. The recipient database 206 may be configured to store a plurality of recipient profiles 208 using a suitable data storage format and schema. The recipient database 206 may be a relational database that utilizes structured query language for the storage, identification, modifying, updating, accessing, etc. of structured data sets stored therein. Each recipient profile 208 may be a structured data set configured to store data related to a recipient 106 registered as authorized to receive and decrypt messages broadcast by the broadcasting computing system 104. A recipient profile 208 may include at least the recipient public key associated with the related recipient 106, and may also include a recipient identifier (e.g., device identifier associated with the recipient computing device 108) and any other data that may be used in validation of messages received from the recipient computing device 108, such as authentication data.

The processing server 102 may also include a broadcast database 210. The broadcast database 210 may be configured to store a plurality of broadcast profiles 212 using a suitable data storage format and schema. The broadcast database 210 may be a relational database that utilizes structured query language for the storage, identification, modifying, updating, accessing, etc. of structured data sets stored therein. Each broadcast profile 212 may be a structured data set configured to store data related to a broadcast computing system 104, such as a broadcast public key received therefrom, content encryption keys used by the broadcasting computing system 104 and corresponding unique identifiers. In some cases, a broadcast profile 212 may also include data associated with authorized recipients 106, such as the device identifier for each recipient 106 authorized by a broadcasting computing system 104, such as in cases where the processing server 102 may operate with different broadcasting computing systems 104.

The processing server 102 may include a querying module 214. The querying module 214 may be configured to execute queries on databases to identify information. The querying module 214 may receive one or more data values or query strings, and may execute a query string based thereon on an indicated database, such as the recipient database 206, to identify information stored therein. The querying module 214 may then output the identified information to an appropriate engine or module of the processing server 102 as necessary. The querying module 214 may, for example, execute a query on the recipient database 206 to identify a recipient profile 208 corresponding to a received key request using the device identifier included therein, or a query on the broadcast database 210 to identify a broadcast profile 212 that includes a unique identifier included in a received key request.

The processing server 102 may also include a data identification module 216. The data identification module 216 may be configured to identify data for use by the processing server 102 in performing the functions discussed herein. The data identification module 216 may receive instructions as input, may identify data as instructed, and may output the identified data to another module or engine of the processing server 102. For example, the data identification module 216 may be configured to identify a unique identifier that is associated with a content encryption key for distribution to recipient computing devices 108. In some cases, the data identification module 216 may be configured to generate unique identifiers, such as using a random number generator or other suitable method. In other cases, a unique identifier may be provided by the broadcasting computing system 104, where the data identification module 216 may be configured to identify the unique identifier associated with a broadcast message, such as by instructing the querying module 214 to execute a query on a broadcast profile 212 that includes the unique identifier (e.g., based on an identification value associated with the respective broadcasting computing system 104).

The processing server 102 may also include a verification module 218. The verification module 218 may be configured to verify data for the processing server 102 for use in performing the functions discussed herein. The verification module 218 may receive instructions as input, may verify data as instructed, and may output a result of the verification to another module or engine of the processing server 102. In some embodiments, the instructions may be accompanied by data that is to be verified and/or data to use in the verification. In other embodiments, the verification module 218 may be configured to obtain such data, such as by instructing the querying module 214 to execute queries on databases and memory of the processing server 102 to identify the data. The verification module 218 may, for example, be configured to verify a key request as being received from an authorized recipient computing device 108, such as by determining if the unique identifier corresponds to a content encryption key that is still valid, validating a supplied device identifier as corresponding to a registered recipient 106, etc.

The processing server 102 may also include an encryption module 220. The encryption module 220 may be configured to encrypt or decrypt data and generate encryption keys for use in performing the functions of the processing server 102 discussed herein. The encryption module 220 may receive data to encrypt, encrypted data to decrypt, or a request to generate a cryptographic key pair as an instruction, may perform the requested function, and output the respective data to another module or engine of the processing server 102. The encryption module 220 may, for example, be configured to encrypt content encryption keys using recipient public keys, decrypt broadcast requests and key requests using a server private key, generate a cryptographic key pair to use as a server public key and server private key, generate a cryptographic key pair to use as a content encryption keys, etc.

The processing server 102 may also include a transmitting device 222. The transmitting device 222 may be configured to transmit data over one or more networks via one or more network protocols. In some instances, the transmitting device 222 may be configured to transmit data to broadcasting computing systems 104, recipient computing devices 108, distribution systems 112, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to broadcasting computing systems 104 that are superimposed or otherwise encoded with content encryption keys and corresponding unique identifiers, which may be encrypted using a broadcast public key prior to transmission. The transmitting device 222 may be configured to electronically transmit data signals to recipient computing devices 108 that are superimposed or otherwise encoded with encrypted content encryption keys for use thereby in decrypting broadcast messages. The transmitting device 222 may also be configured to electronically transmit data signals superimposed or otherwise encoded with encrypted broadcast messages to distribution systems 112 and recipient computing devices 108 as part of the broadcasting of the respective message.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, a server public key and private key, content encryption keys and associated unique identifiers if not included in broadcast profiles 212, encrypted broadcast messages, etc.

Process for Distribution and Decryption of Encrypted Broadcast Messages

Figure 3A:
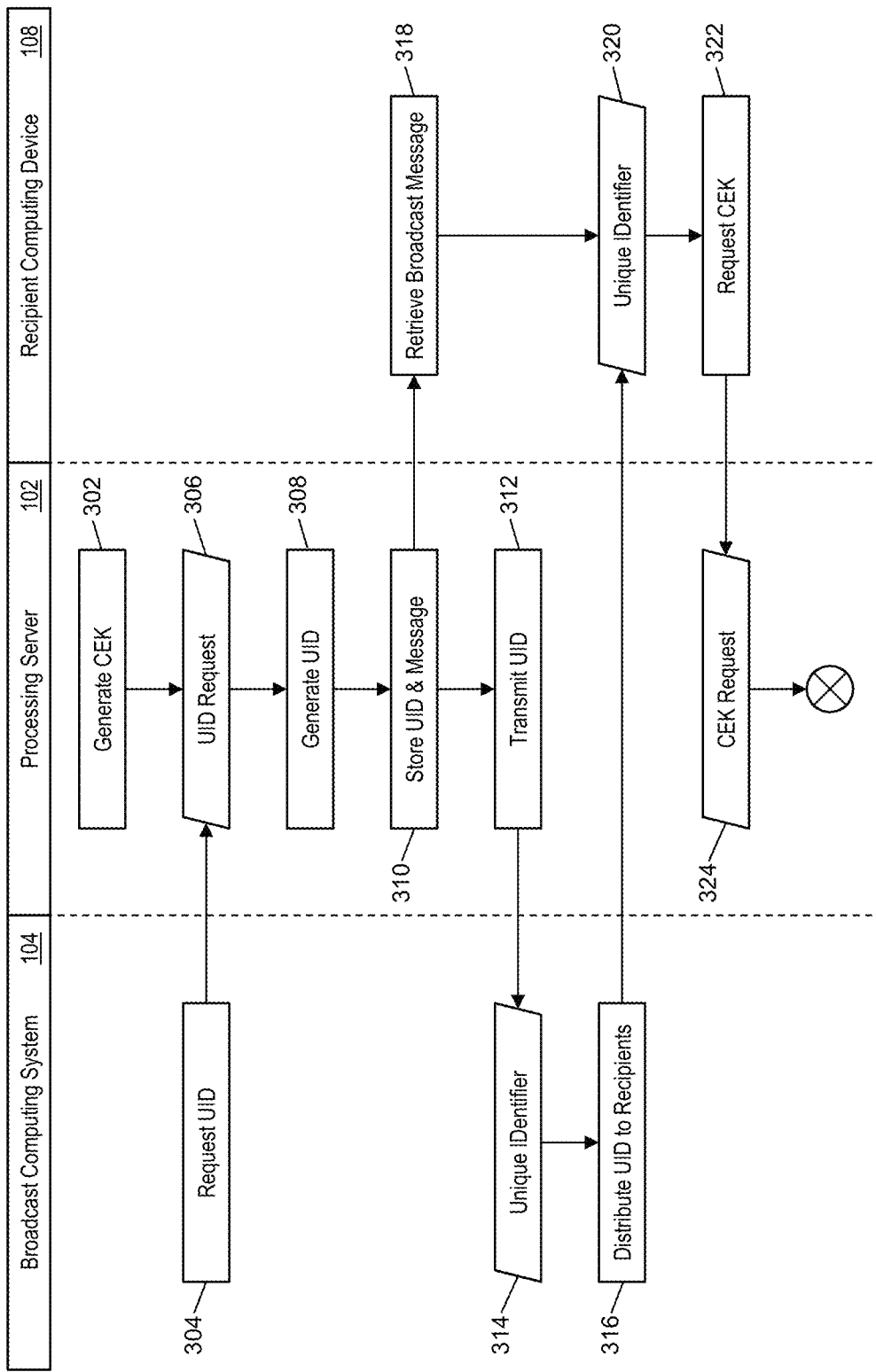
FIGS. 3A and 3B are a flow diagram illustrating a process for broadcasting of encrypted data and distribution of encrypted keys for the decryption thereof in the system of FIG. 1 in accordance with exemplary embodiments.
Figure 3B:
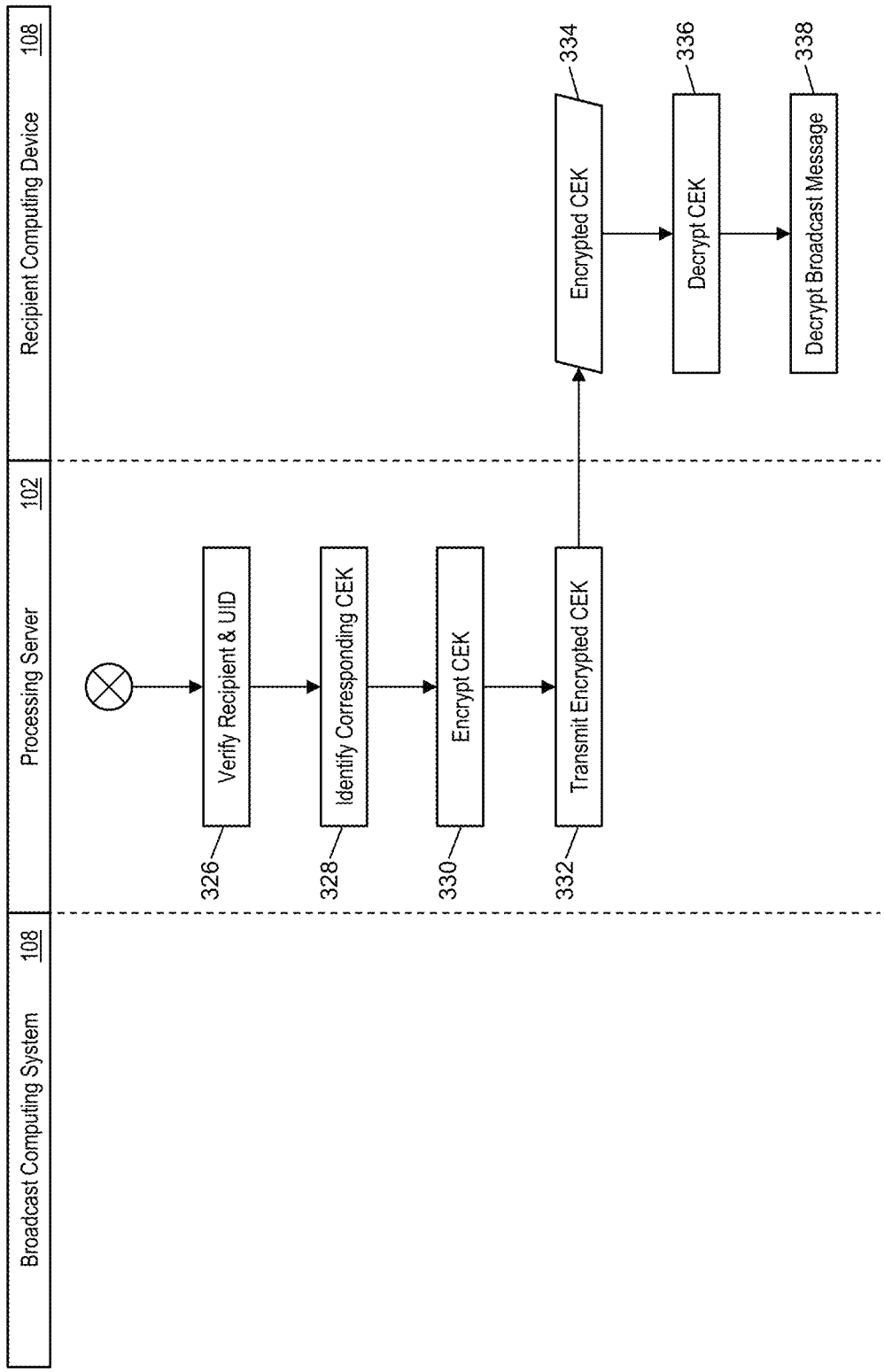

FIGS. 3A and 3B illustrate a process for the broadcasting of encrypted broadcast messages for receipt by a plurality of recipient computing devices 108 through the use of the processing server 102 in the system 100 of FIG. 1 as an intermediate third party for the distribution of keys for decryption of the broadcast messages.

In step 302, the encryption module 220 of the processing server 102 may generate a content encryption key for use in encrypting a broadcast message. In some embodiments, the generated content encryption key may be distributed (e.g., by the transmitting device 222 of the processing server 102) to the broadcast computing system 104. In some embodiments, the content encryption key may be generated by the broadcast computing system 104 and transmitted to the processing server 102 for receipt thereby by the receiving device 202, in step 302.

In step 304, the broadcast computing system 104 may electronically transmit a request for a unique identifier to the processing server 102 using a suitable communication network and method. In step 306, the receiving device 202 of the processing server 102 may receive the request. The request may include at least the encrypted broadcast message, which has been encrypted using the content encryption key. In some embodiments, the request may include the unencrypted broadcast message, which may then be encrypted by the encryption module 220 of the processing server 102 using the content encryption key. In step 308, the data identification module 216 of the processing server 102 may generate a unique identifier to be associated with the content encryption key.

In step 310, the querying module 214 of the processing server 102 may execute a query on the memory 224 of the processing server 102 to store the unique identifier and encrypted broadcast message therein. In some embodiments, the unique identifier and encrypted broadcast message may be stored in a broadcast profile 212 associated with the broadcast computing system 104. In some cases, the encrypted broadcast message may be stored in a location accessible by recipient computing devices 108, or may be otherwise broadcast for receipt by recipient computing devices 108 either directly from the processing server 102 or through one or more distribution systems 112.

In step 312, the transmitting device 222 of the processing server 102 may electronically transmit the unique identifier to the broadcast computing system 104 in response to the received request using a suitable communication network and method. In some embodiments, the unique identifier may first be encrypted by the encryption module 220 of the processing server 102 using a broadcast public key associated with the broadcast computing system 104 (e.g., included in a corresponding broadcast profile 212 identified by the querying module 214 of the processing server 102). In step 314, the broadcast computing system 104 may receive, and decrypt, if applicable, the unique identifier. In step 316, the broadcast computing system 104 may distribute the unique identifier to authorized recipient computing devices 108 using any suitable communication network 110.

In step 318, the recipient computing device 108 may receive the encrypted broadcast message following the broadcasting thereof by the processing server 102 or distribution system 112. In step 320, the recipient computing device 108 may receive the unique identifier distributed by the broadcast computing system 104. In step 322, the recipient computing device 108 may submit a key request to the processing server 102 using a suitable communication network and method. In some embodiments, the recipient computing device 108 may encrypt the key request using a server public key associated with the processing server 102, such as may have been distributed to the recipient computing device 108 during a registration process.

In step 324, the receiving device 202 of the processing server 102 may receive the key request. The key request may include at least the unique identifier distributed to the recipient computing device 108, and may also include a recipient identification value and any other data that may be used in validation, such as authentication data. In cases where the key request may be encrypted, the encryption module 220 of the processing server 102 may decrypt the key request using the server private key (e.g., identified in the memory 224 by the querying module 214 of the processing server 102). In step 326, the verification module 218 may verify that the unique identifier included in the key request is valid (e.g., corresponds to an active content encryption key) and may also verify any other data included therein, such as that an included recipient identification value is registered to an authorized recipient 106. Upon successful validation, in step 328, the querying module 214 of the processing server 102 may execute a query on the memory 224 or broadcast database 210, as applicable, to identify the content encryption key associated with the received unique identifier.

In step 330, the encryption module 220 of the processing server 102 may encrypt the content encryption key using a recipient public key associated with the recipient computing device 108, such as may be identified in a recipient profile 208 associated with the recipient computing device 108 as identified via execution of a query on the recipient database 206 by the querying module 214 of the processing server 102 using the recipient identification value. In step 332, the transmitting device 222 of the processing server 102 may electronically transmit the encrypted content encryption key to the recipient computing device 108. In step 334, the recipient computing device 108 may receive the encrypted content encryption key, and then, in step 336, decrypt the content encryption key using the recipient private key. In step 338, the decrypted content encryption key may be used to decrypt the broadcast message and obtain the unencrypted broadcast message.

Exemplary Method for Facilitating the Broadcast of Encrypted Data

Figure 4:
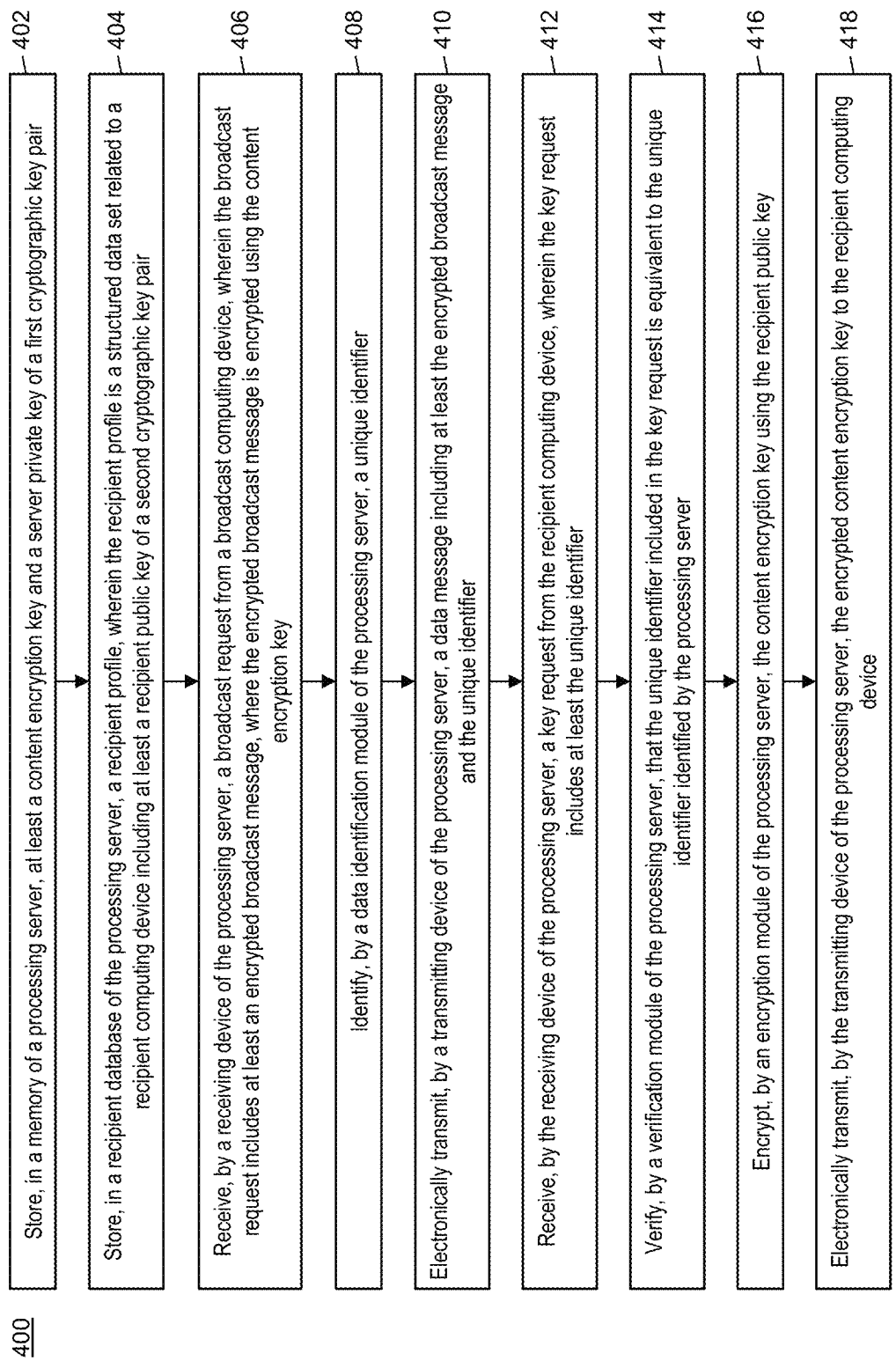
FIG. 4 is a flow chart illustrating an exemplary method for facilitating the broadcast of encrypted data in accordance with exemplary embodiments.

FIG. 4 illustrates a method 400 for the facilitation of the broadcast of encrypted data from a broadcasting computing system to a recipient computing device via the use of a processing server as an intermediary for the distribution of a content encryption key used to decrypt the encrypted, broadcasted data.

In step 402, at least a content encryption key and a server private key of a first cryptographic key pair may be stored in a memory (e.g., the memory 224) of a processing server (e.g., the processing server 102). In step 404, a recipient profile (e.g., recipient profile 208) may be stored in a recipient database (e.g., the recipient database 206) of the processing server, wherein the recipient profile is a structured data set related to a recipient computing device (e.g., a recipient computing device 108) including at least a recipient public key of a second cryptographic key pair. In step 406, a broadcast request may be received by a receiving device (e.g., the receiving device 202) of the processing server from a broadcast computing device (e.g., the broadcast computing system 104), wherein the broadcast request includes at least an encrypted broadcast message, where the encrypted broadcast message is encrypted using the content encryption key.

In step 408, a unique identifier may be identified by a data identification module (e.g., the data identification module 216) of the processing server. In step 410, a data message that includes at least the encrypted broadcast message and the unique identifier may be electronically transmitted by a transmitting device (e.g., the transmitting device 222) of the processing server. In step 412, a key request may be received by the receiving device of the processing server from the recipient computing device, wherein the key request includes at least the unique identifier.

In step 414, the unique identifier included in the key request may be verified by a verification module (e.g., the verification module 218) of the processing server as equivalent to the unique identifier identified by the processing server. In step 416, the content encryption key may be encrypted by an encryption module (e.g., the encryption module 220) of the processing server using the recipient public key. In step 418, the encrypted content encryption key may be electronically transmitted by the transmitting device of the processing server to the recipient computing device.

In one embodiment, the unique identifier may be stored in the memory and is directly associated with the content encryption key, and identifying the unique identifier may include executing, by a querying module (e.g., the querying module 214) of the processing server, a query on the memory to identify the unique identifier stored therein. In some embodiments, the method 400 may further include executing, by a querying module of the processing server, a query on the memory to store the identified unique identifier. In one embodiment, the data message may be electronically transmitted to the broadcast computing device. In some embodiments, the data message may be electronically transmitted to a third party computing system (e.g., the distribution system 112).

In one embodiment, the received key request may be encrypted using a server public key corresponding to the server private key of the first cryptographic key pair, and receiving the key request may include decrypting, by the encryption module of the processing server, the encrypted key request using the server private key. In some embodiments, the recipient profile may further include a recipient identification value, the key request may further include the recipient identification value, and the verifying step may further include verifying that the recipient identification value included in the key request is equivalent to the recipient identification value stored in the recipient profile. In one embodiment, the content encryption key may be a symmetric key.

Computer System Architecture

Figure 5:
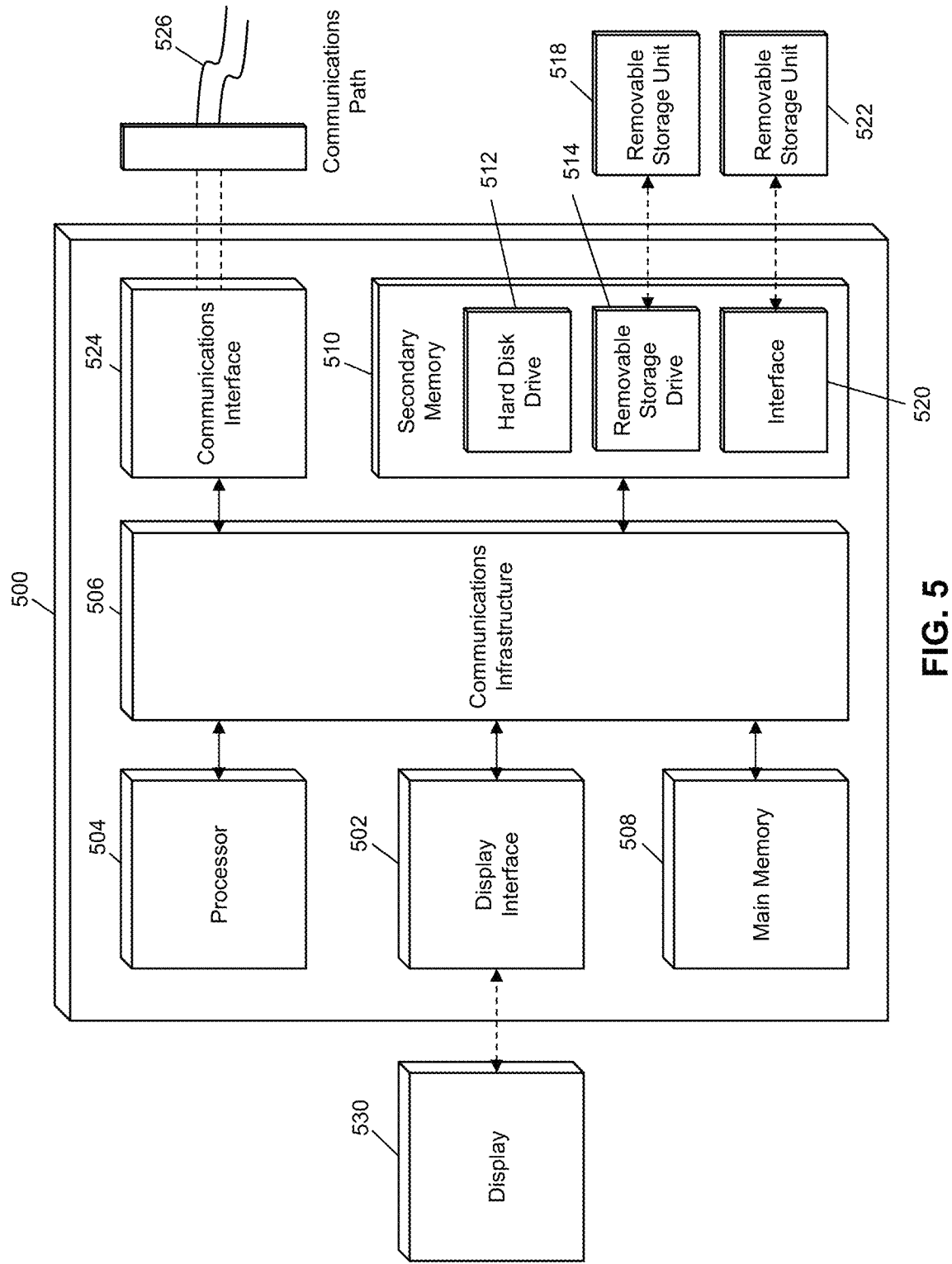
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for facilitating the broadcast of encrypted data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating the broadcast of encrypted data, comprising:

storing, in a memory of a processing server, one or more content encryption keys including at least a first content encryption key;

storing, in a recipient database of the processing server, a recipient profile, wherein the recipient profile is a structured data set related to a recipient computing device including at least a recipient public key of a second cryptographic key pair and a recipient identification value;

receiving, by a receiving device of the processing server, a broadcast request from a broadcast computing device, wherein the broadcast request includes at least an encrypted broadcast message, where the encrypted broadcast message is encrypted using the first content encryption key;

identifying, by a data identification module of the processing server, a unique identifier directly associated with the first content encryption key;

electronically transmitting, by a transmitting device of the processing server, a data message including at least the encrypted broadcast message;

electronically transmitting, by the transmitting device of the processing server, the unique identifier to the broadcast computing device for distribution to a plurality of authorized recipient computing devices including the recipient computing device;

receiving, by the receiving device of the processing server, a key request from the recipient computing device, wherein the key request includes at least the unique identifier and the recipient identification value;

verifying, by a verification module of the processing server, that the unique identifier included in the key request is equivalent to the unique identifier identified by the processing server and that the recipient identification value included in the key request is equivalent to the recipient identification value stored in the recipient profile;

responsive to the verification, identifying, by a querying module of the processing server, the first content encryption key from among the stored one or more content encryption keys based on the association of the unique identifier with the first content encryption key;

encrypting, by an encryption module of the processing server, the first content encryption key using the recipient public key; and electronically transmitting, by the transmitting device of the processing server, the encrypted first content encryption key to the recipient computing device.

2. The method of claim 1, wherein
identifying the unique identifier includes executing, by the querying module of the processing server, a query on the memory to identify the unique identifier stored therein.

3. The method of claim 1, further comprising:
executing, by the querying module of the processing server, a query on the memory to store the identified unique identifier.

4. The method of claim 1, wherein the data message is electronically transmitted to the broadcast computing device.

5. The method of claim 1, wherein the data message is electronically transmitted to a third party computing system.

6. The method of claim 1, further comprising storing, in the memory of the processing server, a server private key of a first cryptographic key pair, wherein
the received key request is encrypted using a server public key corresponding to the server private key of the first cryptographic key pair, and
receiving the key request includes decrypting, by the encryption module of the processing server, the encrypted key request using the server private key.

7. The method of claim 1, wherein the first content encryption key is a symmetric key.

8. A system for facilitating the broadcast of encrypted data, comprising:
a hardware processing device of a processing server;
an encryption module of the processing server;
a memory of the processing server configured to store one or more content encryption keys including at least a first content encryption key;
a recipient database of the processing server configured to store a recipient profile, wherein the recipient profile is a structured data set related to a recipient computing device including at least a recipient public key of a second cryptographic key pair and a recipient identification value;
the hardware processing device of the processing server configured to receive a broadcast request from a broadcast computing device, wherein the broadcast request includes at least an encrypted broadcast message, where the encrypted broadcast message is encrypted using the first content encryption key;

the hardware processing device of the processing server configured to identify a unique identifier directly associated with the first content encryption key;

the hardware processing device of the processing server configured to electronically transmit a data message including at least the encrypted broadcast message; and the hardware processing device of the processing server configured to electronically transmit the unique identifier to the broadcast computing device for distribution to a plurality of authorized recipient computing devices including the recipient computing device, wherein the hardware processing device of the processing server is further configured to receive a key request from the recipient computing device, wherein the key request includes at least the unique identifier and the recipient identification value, the hardware processing device of the processing server is configured to verify that the unique identifier included in the key request is equivalent to the unique identifier identified by the processing server and that the recipient identification value included in the key request is equivalent to the recipient identification value stored in the recipient profile, responsive to the verification, the hardware processing device is configured to identify the first content encryption key from among the stored one or more content encryption keys based on the association of the unique identifier with the first content encryption key, the encryption module of the processing server is configured to encrypt the first content encryption key using the recipient public key, and the hardware processing device of the processing server is further configured to electronically transmit the encrypted first content encryption key to the recipient computing device.

9. The system of claim 8, wherein
identifying the unique identifier includes executing, by a querying module of the processing server, a query on the memory to identify the unique identifier stored therein.

10. The system of claim 8, further comprising:
a querying module of the processing server configured to execute a query on the memory to store the identified unique identifier.

11. The system of claim 8, wherein the data message is electronically transmitted to the broadcast computing device.

12. The system of claim 8, wherein the data message is electronically transmitted to a third party computing system.

13. The system of claim 8, wherein the memory of the processing server is further configured to store a server private key of a first cryptographic key pair, wherein
the received key request is encrypted using a server public key corresponding to the server private key of the first cryptographic key pair, and
receiving the key request includes decrypting, by the encryption module of the processing server, the encrypted key request using the server private key.

14. The system of claim 8, wherein the first content encryption key is a symmetric key.

* * * * *